US011799361B2

(12) United States Patent
Gupta et al.

(10) Patent No.: US 11,799,361 B2
(45) Date of Patent: Oct. 24, 2023

(54) END COVERS CONFIGURED TO DIRECT FLUID FOR THERMAL MANAGEMENT OF ELECTRIC MACHINE FOR ELECTRIFIED VEHICLE

(71) Applicant: Ford Global Technologies, LLC, Dearborn, MI (US)

(72) Inventors: Man Prakash Gupta, Dearborn, MI (US); Franco Leonardi, Dearborn Heights, MI (US); Alfredo R. Munoz, Ann Arbor, MI (US); Michael W. Degner, Novi, MI (US); Prasad Dev Hanumalagutti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 527 days.

(21) Appl. No.: 16/939,351

(22) Filed: Jul. 27, 2020

(65) Prior Publication Data
US 2022/0029508 A1     Jan. 27, 2022

(51) Int. Cl.
*H02K 9/193*   (2006.01)
*H02K 3/24*    (2006.01)
*H02K 5/20*    (2006.01)
*B60K 11/02*   (2006.01)
*B60K 1/00*    (2006.01)

(52) U.S. Cl.
CPC .............. *H02K 9/193* (2013.01); *H02K 3/24* (2013.01); *H02K 5/203* (2021.01); *B60K 11/02* (2013.01); *B60K 2001/006* (2013.01)

(58) Field of Classification Search
CPC  H02K 5/20; H02K 5/203; H02K 3/24; H02K 9/193; B60K 11/02; B60K 2001/006
See application file for complete search history.

(56) References Cited

U.S. PATENT DOCUMENTS

| 8,508,085 | B2  |  8/2013 | Bradfield |
| 9,130,421 | B2  |  9/2015 | Chamberlin et al. |
| 2007/0278867 | A1 | 12/2007 | White |
| 2016/0156251 | A1* | 6/2016 | Sakurai ................ H02K 9/06 310/58 |

(Continued)

FOREIGN PATENT DOCUMENTS

| CN | 103904795 A |  | 7/2014 |  |
| DE | 102017208550 A1 | * | 11/2018 | ............... H02K 1/16 |
| GB | 796970 A | * | 6/1958 |  |

*Primary Examiner* — Tulsidas C Patel
*Assistant Examiner* — Robert E Mates
(74) *Attorney, Agent, or Firm* — David B. Kelley; Carlson, Gaskey & Olds, P.C.

(57) ABSTRACT

This disclosure relates to thermal management for an electric machine, such as an electric motor, of an electrified vehicle. An example assembly includes a stator having a core and a jacket at least partially surrounding the core. The jacket radially encloses a slot and is configured to permit fluid to flow within the slot from a first face of the stator to a second face of the stator. The assembly further includes a first end cover covering the first face of the stator. The first end cover has an inlet port and is configured to direct fluid from the inlet into the slot. Further, the assembly includes a second end cover covering the second face of the stator and configured to direct fluid that exits the slot.

15 Claims, 9 Drawing Sheets

(56) References Cited

U.S. PATENT DOCUMENTS

| | | | |
|---|---|---|---|
| 2017/0267055 A1* | 9/2017 | Hanumalagutti | H02K 3/24 |
| 2017/0271956 A1* | 9/2017 | Hanumalagutti | H02K 3/12 |
| 2018/0262068 A1 | 9/2018 | Koshino | |
| 2020/0153298 A1* | 5/2020 | Takahashi | H02K 7/003 |
| 2020/0403463 A1* | 12/2020 | Hoerz | H02K 1/16 |

* cited by examiner

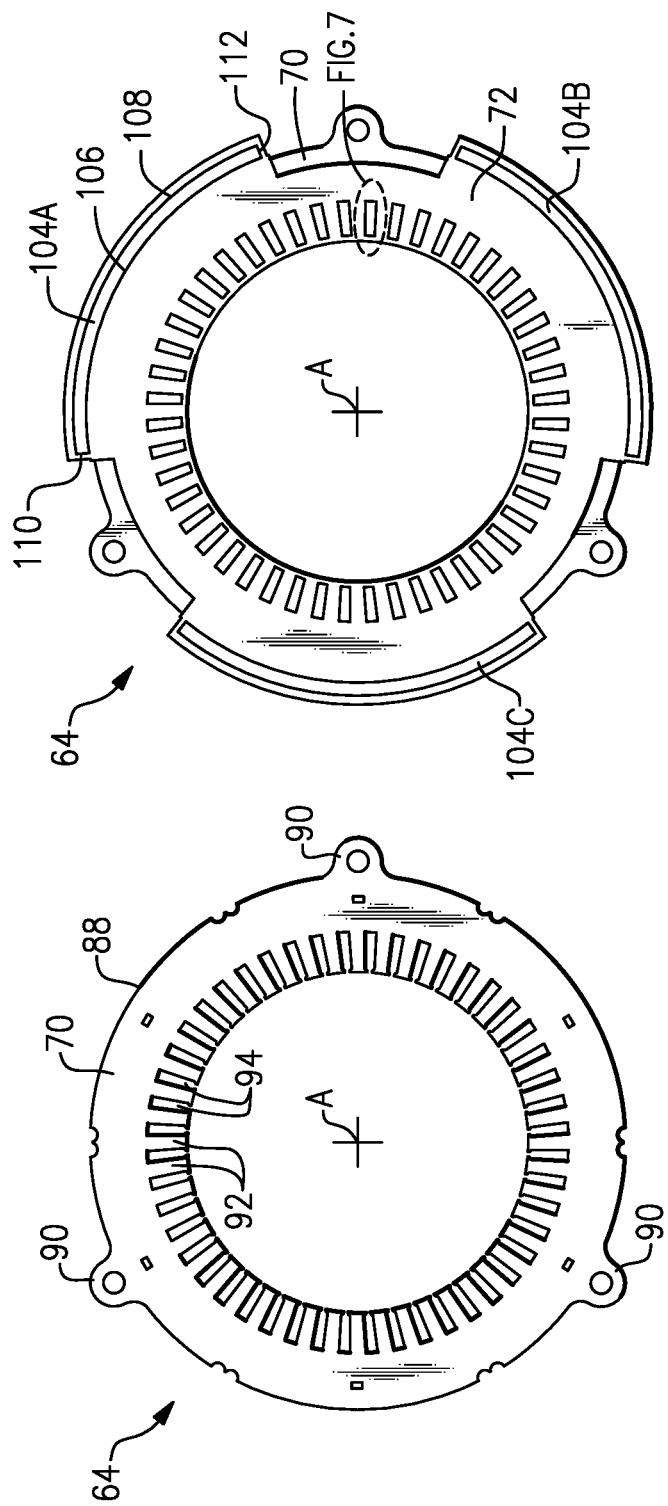
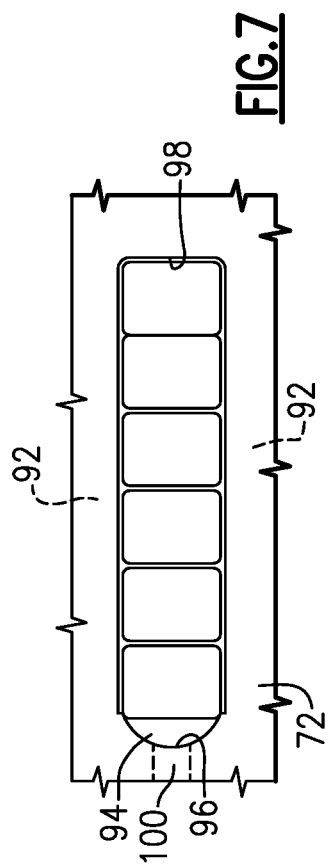

END COVERS CONFIGURED TO DIRECT FLUID FOR THERMAL MANAGEMENT OF ELECTRIC MACHINE FOR ELECTRIFIED VEHICLE

TECHNICAL FIELD

This disclosure relates to thermal management for an electric machine, such as an electric motor, of an electrified vehicle.

BACKGROUND

The need to reduce fuel consumption and emissions in vehicles is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. The electric machines may need to be thermally managed (i.e., heated or cooled) during operation of the electrified vehicle.

SUMMARY

An assembly for an electric machine of an electrified vehicle according to an exemplary aspect of the present disclosure includes, among other things, a stator including a core and a jacket at least partially surrounding the core. The jacket radially encloses a slot and is configured to permit fluid to flow within the slot from a first face of the stator to a second face of the stator. The assembly further includes a first end cover covering the first face of the stator. The first end cover includes an inlet port and is configured to direct fluid from the inlet into the slot. Further, the assembly includes a second end cover covering the second face of the stator and configured to direct fluid that exits the slot.

In a further non-limiting embodiment of the foregoing assembly, the jacket is made of epoxy and the core is made of iron.

In a further non-limiting embodiment of any of the foregoing assemblies, the jacket includes a channel, and the channel is on a radially opposite side of the stator as the slot.

In a further non-limiting embodiment of any of the foregoing assemblies, the second end cover is configured to direct fluid exiting the slot into the channel.

In a further non-limiting embodiment of any of the foregoing assemblies, the first end cover includes an outlet port, and the first end cover includes a divider radially between the inlet port and the outlet port.

In a further non-limiting embodiment of any of the foregoing assemblies, the inlet port is configured to direct fluid into the channel and the slot, and the second end cover includes an outlet port in fluid communication with fluid exiting the channel and the slot.

In a further non-limiting embodiment of any of the foregoing assemblies, the channel is one of at least two channels, the inlet port is configured to direct fluid into the slot and a first channel of the at least two channels, the second end cover is configured to direct fluid exiting the slot and the first channel into a second channel of the at least two channels, and the first end cover includes an outlet port in fluid communication with the second channel.

In a further non-limiting embodiment of any of the foregoing assemblies, the at least two channels includes three channels circumferentially spaced-apart from one another by mounting tabs of the stator.

In a further non-limiting embodiment of any of the foregoing assemblies, the first end cover includes a divider, and the inlet is sized to permit fluid entering the first end cover to flow on opposite radial sides of the divider.

In a further non-limiting embodiment of any of the foregoing assemblies, fluid entering the first end cover on a radially inner side of the divider flows toward the second end cover via the slot, and fluid entering the first end cover on a radially outer side of the divider flows toward the second end cover via the channel.

In a further non-limiting embodiment of any of the foregoing assemblies, the inlet is bisected by the divider.

In a further non-limiting embodiment of any of the foregoing assemblies, the slot is one of a plurality of slots.

In a further non-limiting embodiment of any of the foregoing assemblies, coil windings are arranged in the slot.

In a further non-limiting embodiment of any of the foregoing assemblies, the first end cover includes a projection and the first face of the stator includes a recess receiving the projection of the first end cover, and the second end cover includes a projection and the second face of the stator includes a recess receiving the projection of the second end cover.

In a further non-limiting embodiment of any of the foregoing assemblies, the assembly includes a rotor configured to rotate within stator.

In a further non-limiting embodiment of any of the foregoing assemblies, the electric machine is an electric motor.

A method according to an exemplary aspect of the present disclosure includes, among other things, directing fluid from a first end cover of a stator toward a second end cover of the stator through a slot formed in a jacket covering a core of the stator.

In a further non-limiting embodiment of the foregoing method, the method includes using the second end cover to direct fluid exiting the slot toward the first end cover through a channel in the jacket.

In a further non-limiting embodiment of any of the foregoing methods, the slot and channel are arranged on opposite radial sides of the stator.

In a further non-limiting embodiment of any of the foregoing methods, the method includes directing fluid from the first end cover to the second end cover through the slot and through a channel in the jacket.

BRIEF DESCRIPTION OF THE DRAWINGS

FIG. 5 is an end view of a core of a stator.

FIG. 6 is an end view of the stator with a jacket covering the core.

FIG. 7 is a close-up view of a slot of the stator.

DETAILED DESCRIPTION

This disclosure relates to thermal management for an electric machine, such as an electric motor, of an electrified vehicle. An example assembly includes a stator having a core and a jacket at least partially surrounding the core. The jacket radially encloses a slot and is configured to permit fluid to flow within the slot from a first face of the stator to a second face of the stator. The assembly further includes a first end cover covering the first face of the stator. The first end cover has an inlet port and is configured to direct fluid from the inlet into the slot. Further, the assembly includes a second end cover covering the second face of the stator and configured to direct fluid that exits the slot. This disclosure has a number of other benefits which will be appreciated from the following description. Among them, this disclosure directs fluid (i.e., coolant) on radially inner and outer sides of a stator, which enhances heat transfer. The assembly of this disclosure is also relatively easily manufactured.

Figure 1:
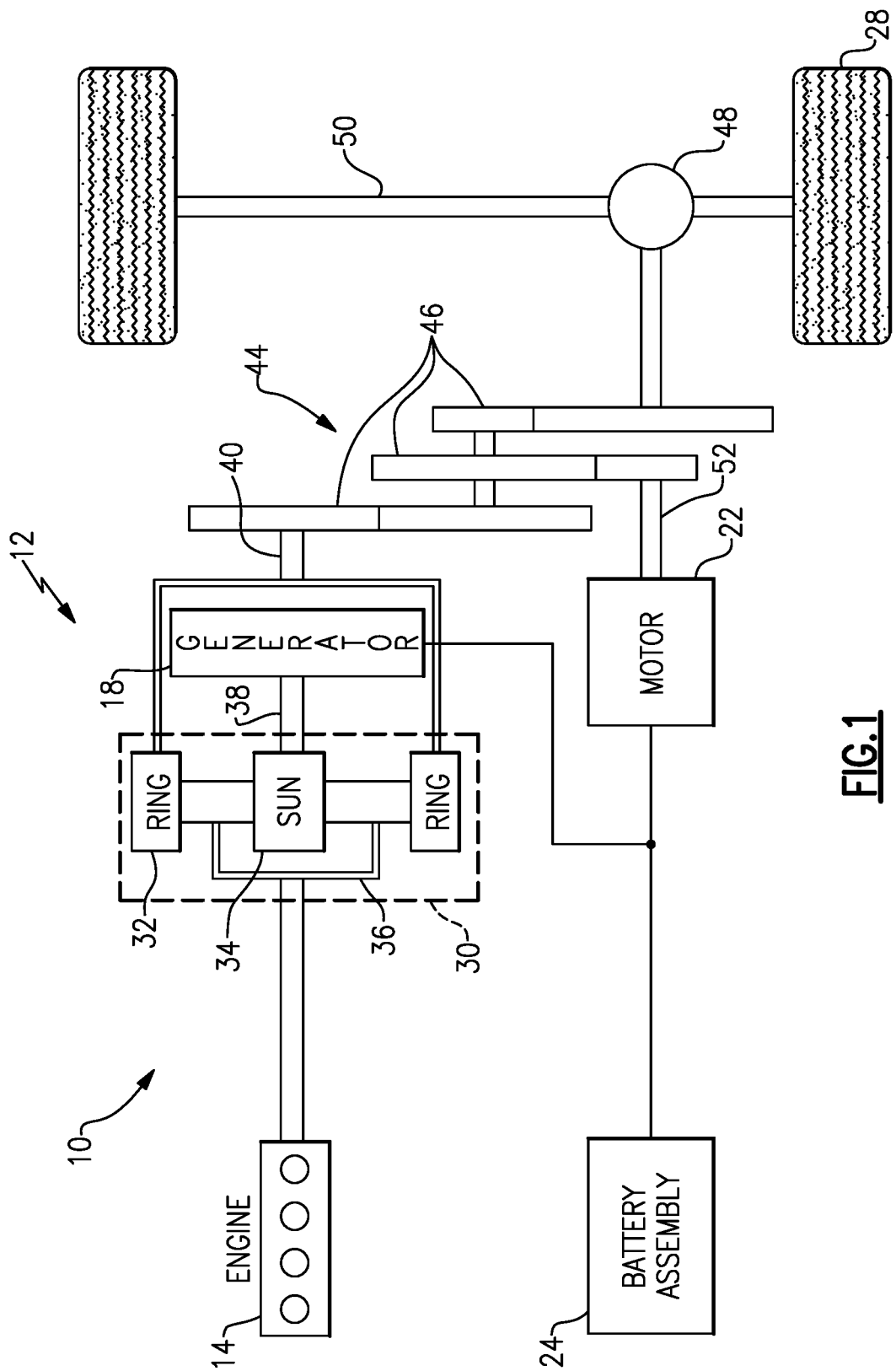
FIG. 1 schematically illustrates an example powertrain of an electrified vehicle.

FIG. 1 schematically illustrates an example powertrain 10 for an electrified vehicle 12 ("vehicle 12"), which in this example is a hybrid electric vehicle (HEV). The powertrain 10 may be referred to as a hybrid transmission. Although depicted as an HEV, it should be understood that the concepts described herein are not limited to HEVs and could extend to other electrified vehicles, including, but not limited to, plug-in hybrid electric vehicles (PHEVs), and battery electric vehicles (BEVs). This disclosure also extends to various types of hybrid vehicles including full hybrids, parallel hybrids, series hybrids, mild hybrids, micro hybrids, and plug-in hybrids. Further, the vehicle 12 is depicted schematically in FIG. 1, but it should be understood that this disclosure is not limited to any particular type of vehicle, and extends to cars, trucks, sport utility vehicles (SUVs), vans, etc.

In the embodiment of FIG. 1, the powertrain 10 is a power-split transmission that employs a first drive system and a second drive system. The first drive system includes a combination of an engine 14 and a generator 18 (i.e., a first electric machine). The second drive system includes at least a motor 22 (i.e., a second electric machine) and a battery assembly 24 (which may be referred to simply as a "battery"). In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes a plurality of battery cells capable of outputting electrical power to operate the motor 22 and the generator 18. Other types of energy storage devices and/or output devices can also be used to electrically power the electrified vehicle 12.

In one non-limiting embodiment, the vehicle 12 has two basic operating modes. The vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
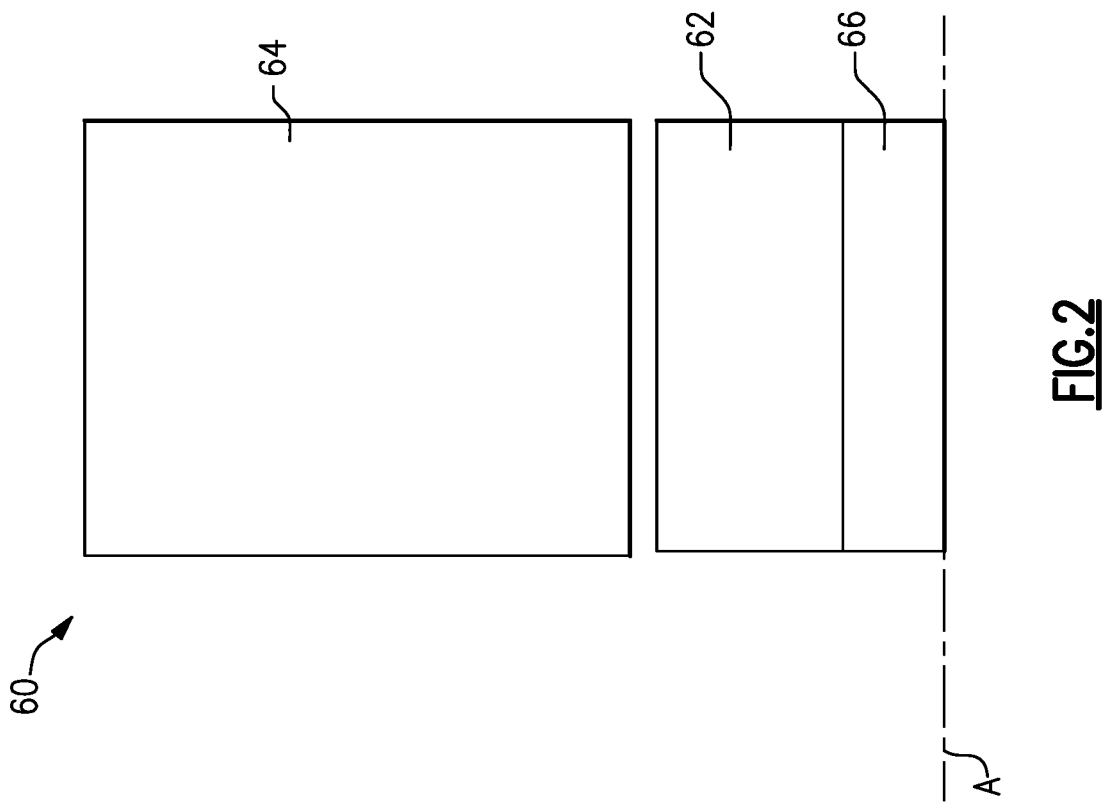
FIG. 2 schematically illustrates a portion of an example electric machine in cross-section.

FIG. 2 schematically illustrates a portion of an electric machine 60 in cross-section. The electric machine 60 is representative of any electric machine within the electrified vehicle 12, such as either the generator 18 or the motor 22. In FIG. 2, the electric machine 60 includes a rotor 62 received within a stator 64. The rotor 62 is configured to rotate relative to the stator 64 about a central axis A of the electric machine 60. The stator 64 is stationary and does not rotate during operation of the electric machine 60. The rotor 62 is directly connected to a shaft 66, in this example. If the electric machine 60 is used as a motor, rotation of the rotor 62 produces torque which is delivered elsewhere in the vehicle 12 via the shaft 66. If the electric machine 60 is used as a generator, rotation of the rotor 62 about the axis A can generate electric power. The rotor 62 could rotate in response to a torque input from regenerative braking, for example.

Figure 3:
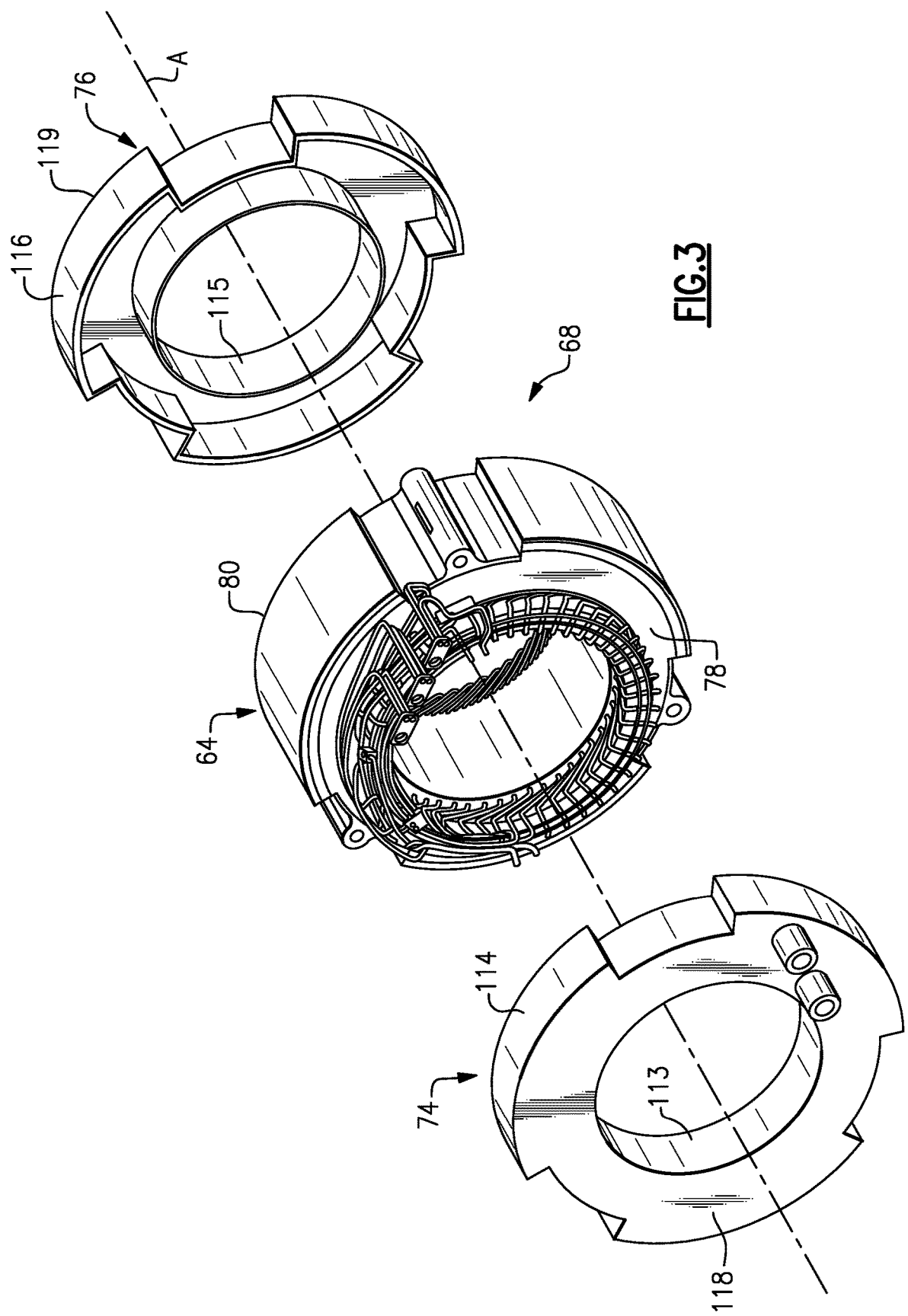
FIG. 3 is an exploded view of an example assembly configured to thermally manage the electric machine.

FIG. 3 is an exploded view of an assembly 68 for the electric machine 60. Specifically, the assembly 68 could be used relative to either the generator 18 and/or the motor 22. While the assembly 68 is shown and described herein relative to an electric machine, this disclosure may be applicable to other electric devices that would benefit from thermal control.

Figure 4:
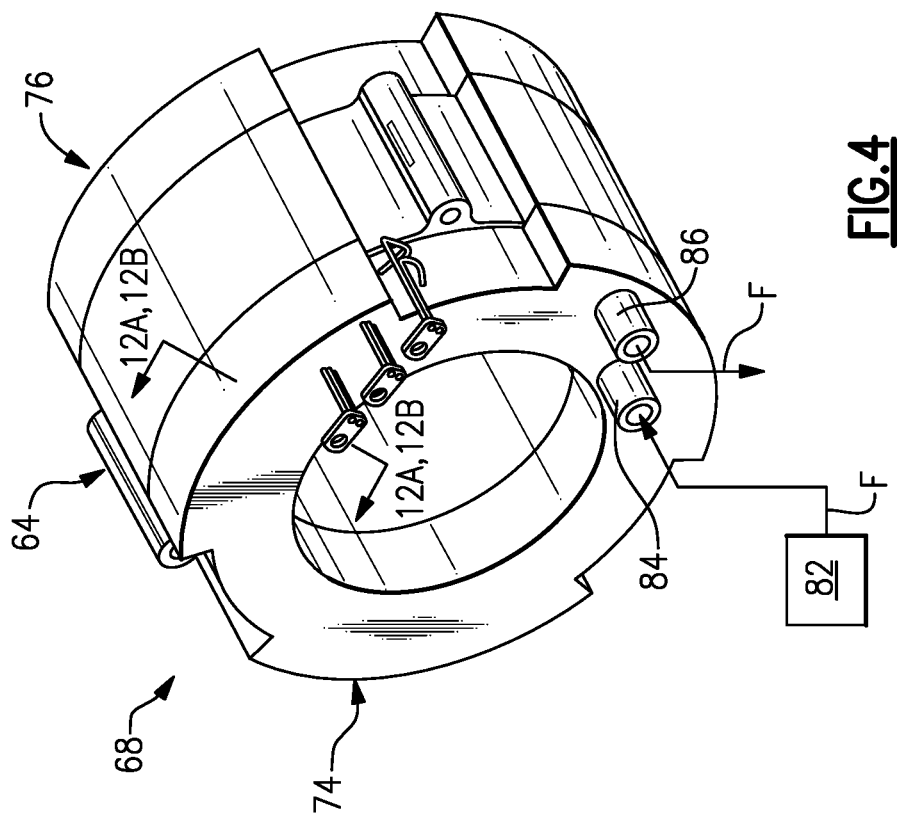
FIG. 4 is an assembled view of the assembly of FIG. 3.

FIG. 4 is an assembled view of the assembly 68. The rotor 62 and shaft 66 are not shown in most drawings of this disclosure for ease of reference, however they would be arranged as in FIG. 2. The assembly 68 includes some components of the electric machine 60. Thus, a reference to the assembly 68 is also a reference to some components of the electric machine 60.

In particular, the assembly 68 includes the stator 64. The stator 64 includes a core 70 (FIG. 5) and a jacket 72 (FIG. 6) at least partially surrounding the core 70. As will be explained below, the jacket 72 is configured to direct fluid relative to the core 70 to thermally manage the stator 64, and in turn the electric machine 60. The assembly 68 further includes a first end cover 74 and a second end cover 76 configured to cover opposing first and second axial end faces 78, 80 of the stator 64, respectively.

The first and second end covers 74, 76 are configured to direct fluid F from a fluid source 82 and through the jacket 72. The fluid source 82 provides the fluid F. Example fluids include refrigerants, oil, or water. Although shown schematically, one would understand that fluid F is directed from the fluid source 82 to and from the assembly 68 via various conduits or passages such as tubes, hoses, pipes, etc. One would also understand that various valves, pumps, seals, and gaskets could be used to direct the fluid F in a particular manner.

In the example of FIGS. 3 and 4, the first end cover 74 includes an inlet 84 fluidly coupled to (i.e., in fluid communication with) the fluid source 82. The first end cover 74 is configured to direct fluid F to flow from the inlet 84 and through the jacket 72 toward the second end cover 76. The second end cover 76 is configured to direct fluid F that has passed through the jacket 72. The term direct is used herein to mean to cause to turn or move to follow a specific course. This disclosure includes a number of embodiments in which the first and second end covers 74, 76 direct the fluid F in different manners.

In the example of FIGS. 3 and 4, the second end cover 76 is configured to direct fluid F that has exited the jacket 72 such that it flows through the jacket 72 again in an opposite direction toward the first end cover 74. The fluid F exiting the jacket 72 for a second time is directed out an outlet 86 in the first end cover 74, in this example. That fluid F then flows to another location, such as a heat exchanger. The stator 64 and the first and second end covers 74, 76 will now be described in more detail.

FIG. 5 is a view of the core 70 of the stator 64 along the axis A. The core 70 may be made of a metallic material, such as iron or steel. The core 70 includes a radially outer surface 88 from which a plurality of mounting tabs 90 (sometimes called mounting ears) project. Mounting tabs are not required in all examples. The stator 64 could be mounted in another manner, such as by using a slot-key mechanism, for example. The mounting tabs 90 are equally spaced-apart apart from one another about the circumference of the core 70, in this example. The core 70 further includes plurality of teeth 92 which project radially inward toward the axis A. The teeth 92 are circumferentially spaced-apart from one another and define slots 94 therebetween. The slots 94 are formed adjacent a radially inner-most surface of the stator 64. The terms "radial" and "circumferential" are used herein with reference to the axis A.

FIG. 6 is a view of the stator 64 including the jacket 72. The jacket 72 is made of a polymer material, in one example. In a particular example, the jacket 72 is made of epoxy. The first and second end covers 74, 76 may be made of the same material as the jacket 72 or a different material.

The jacket 72 is formed over the core 70 by molding, in one example. In particular, the jacket 72 is formed over the core 70 using a transfer molding and/or an overmolding process. Overmolding is the process of adding material over already-existing pieces or parts using a molding process. The result is an integrated component including the original piece or pieces and the additional material added via the overmolding process. Here, the core 70 is placed into a mold and the jacket 72 is molded over the core 70 to form a new, combined structure of the stator 64. The jacket 72 at least partially encapsulates the core 70. In this example, the jacket 72 encapsulates the majority of the core 70, with the exception of the mounting tabs 90.

Before the jacket 72 is added to the core 70, the slots 94 are radially open, meaning there is a circumferential gap between radially-inner ends of the teeth 92. The jacket 72 is formed such that the slots 94 are radially enclosed. In FIG. 7, an example slot 94 is shown. The slot 94 is radially enclosed between a radially inner boundary 96 and a radially outer boundary 98. The radially inner boundary 96 is provided by the jacket 72, which circumferentially spans the gap 100 (shown in phantom) between adjacent teeth 92 (shown in phantom) of the core 70. The slot 94 is circumferentially bound by the jacket 72 covering adjacent teeth 92 of the core 70. The slot 94 extends axially throughout the entire stator 64, specifically from the first axial end face 78 to the second axial end face 80. Further, in this example, coil windings 102 are received in the slot 94. Gaps exist between the coil windings 102 and the radial and circumferential boundaries of the slot 94 such that fluid can flow through the slot 94 from one axial end of the stator 64 to another, in either axial direction. The slot 94 illustrated in FIG. 7 is representative of each of the slots 94 of the stator 64.

The jacket 72 also includes at least one channel configured to permit fluid to flow therethrough. In FIG. 6, there are three channels 104A-104C provided by the jacket 72. The channels 104A-104C are on a radially opposite side of the stator 64 as the slots 94, and in particular are formed outward of the radially outer surface 88 of the core 70. The channels 104A-104C are circumferentially spaced-apart from one another about the circumference of the stator 64. In the example of FIG. 6, adjacent channels 104A-104C are spaced-apart from one another by a mounting tab 90 arranged circumferentially therebetween. While three channels 104A-104C are shown, this disclosure extends to arrangements with one or more channels. Further, if mounting tabs 90 are not present, there may be additional channels, and the channels may be circumferentially closer to one another. While not shown, the channels 104A-104C could include turbulators to induce turbulent flow, thereby leading to enhanced heat transfer.

The channels 104A-104C extend axially along the entire stator 64, specifically from the first axial end face 78 to the second axial end face 80. With respect to the channel 104A, the channels are radially bound by a radially inner boundary 106, which is a surface of the jacket 72 applied over the radially outer surface 88 of the core 70, and a radially outer boundary 108. The radially outer boundary 108 is spaced-apart from the radially inner boundary 106 by radially-extending walls 110, 112, which are circumferentially spaced-apart from one another and provide circumferential boundaries of the channel 104A. Fluid is configured to flow through the channels 104A-104C from one axial side of the stator 64 to another in either axial direction.

Figure 8A:
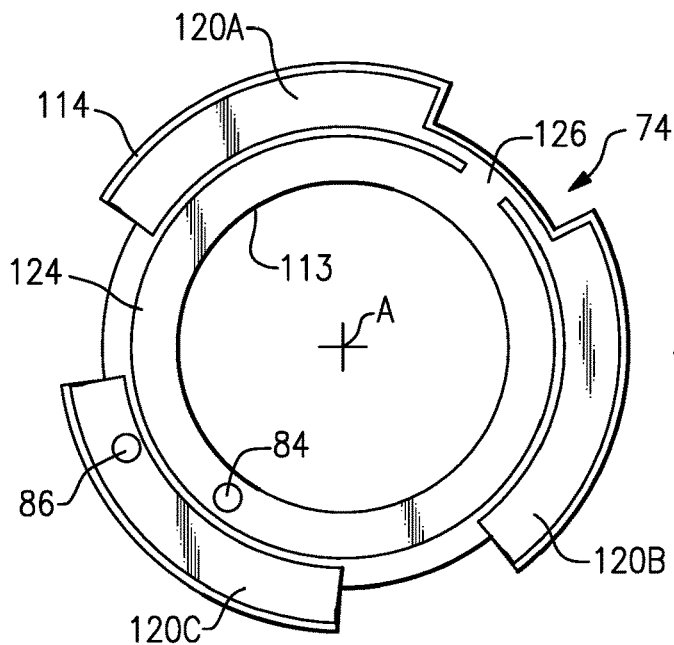
FIG. 8A is an inner end view of a first embodiment of a first end cover.
Figure 8B:
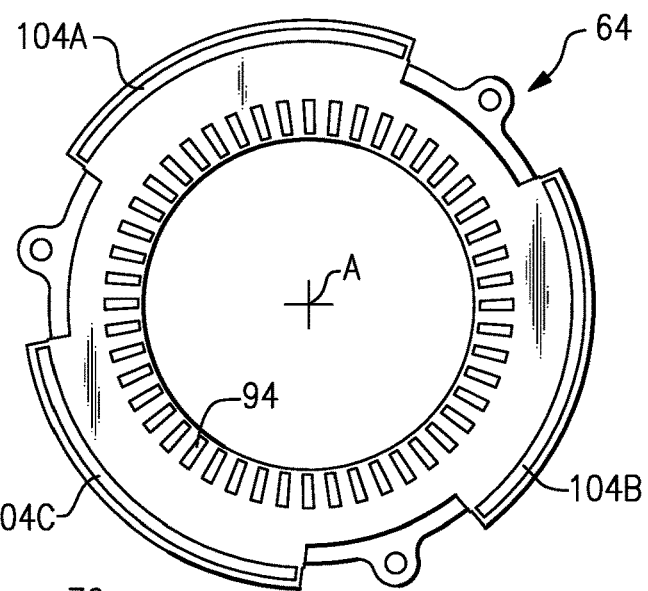
FIG. 8B is an end view of the stator.
Figure 8C:
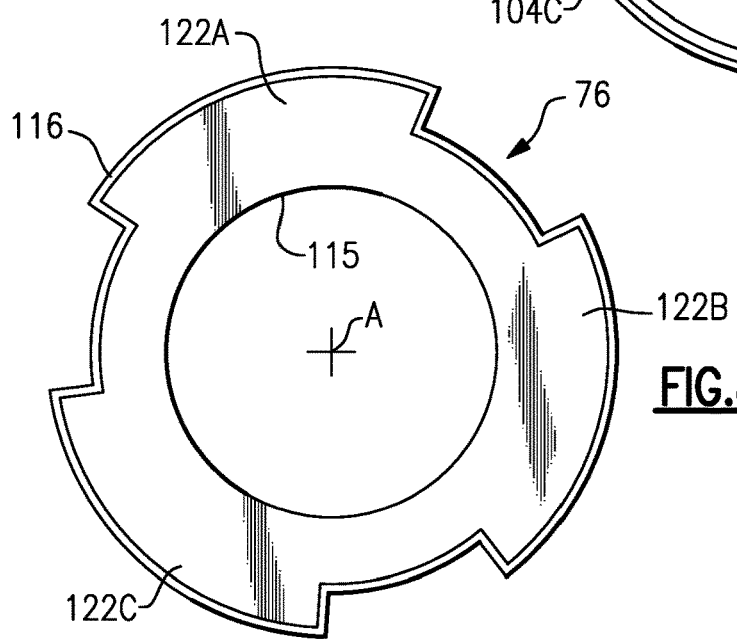
FIG. 8C is an inner end view of a first embodiment of a second end cover.

The first and second end covers 74, 76 are configured to direct fluid relative to the slots 94 and channels 104A-104C in a particular manner in order to thermally manage the stator 64, and in turn the electric machine 60. With reference to FIGS. 8A-8C, the first and second end covers 74, 76 each include a radially inner wall 113, 115 and a radially outer wall 114, 116 projecting axially toward the stator 64 from an axial face 118, 119 (FIG. 3). Axial ends of the radially outer walls 114, 116 directly contact a respective first and second axial end face 78, 80 to define fluid plenums on opposite axial sides of the stator 64. For instance, a first plenum is defined axially between the axial face 118 of the first end cover 74 and the first axial end face 78, and is radially bound by the radially inner and outer walls 113, 114. A second plenum on the opposite axial side of the stator 64 is defined axially between the axial face 119 of the second end cover 76 and the second end face 80, and is radially bound by the radially inner and outer walls 115, 116.

The radially inner walls 113, 115 of the first and second end covers 74, 76 are configured to contact the first and second end faces 78, 80 adjacent the radially inner-most surfaces thereof, namely adjacent the gaps 100 and the radially inner-most ends of the teeth 92. The radially outer walls 114, 116 are configured to contact the first and second end faces 78, 80 at radially-outer surfaces thereof, including adjacent the radially outer surface 88 of the core 70 and adjacent the radial outer boundaries of the channels 104A-104C.

In FIGS. 8A and 8C, the first and second end covers 74, 76 each include three sections 120A-120C, 122A-122C projecting radially outward from a remainder of the respective first and second end cover 74, 76 corresponding to the channels 104A-104C. Each of the sections 120A-120C, 122A-122C is configured such that the radially outer walls 114, 116 directly contacts the boundaries of one of the channels 104A-104C.

Either or both of the first and second end covers 74, 76 may include a divider configured to direct fluid to the slots 94 and/or the channels 104A-104C in a particular manner. In FIG. 8A, the first end cover 74 includes a divider 124 radially between the radially inner wall 113 and the radially outer wall 114. The divider 124 projects axially from the axial end face 118 by the same distance as the radially inner and outer walls 113, 114. A free end of the divider 124 contacts the first axial end face 78. The inlet 84 and outlet 86 are on opposite radial sides of the divider 124.

In this example, the divider 124 provides a complete radial boundary between the inlet 84 and the section 120C. The divider 124 includes a circumferential gap 126, however, circumferentially between the sections 120A and 120B permitting fluid to flow from the inlet 84 to the sections 120A, 120B.

In the example of FIGS. 8A-8C, fluid F enters the inlet 84 and is directed through the slots 94 toward the second end cover 76. Fluid F also flows from the inlet 84, through the gap 126, and through the channels 104A, 104B toward the second end cover 76. The second end cover 76 directs fluid exiting the slots 94 and channels 104A, 104B back toward the first end cover 74 through the channel 104C via section 122C, where the fluid F ultimately flows out the outlet 86.

While this disclosure references inlets and outlets, the flows could be reversed. With reference to FIGS. 8A-8C, fluid F could flow into the outlet 86, through the channel 104C, and back through the stator 64 via the channels 104A, 104B and the slots 94, and out the inlet 84. Thus, the terms inlet and outlet are not intended to be limiting in any of the embodiments in this disclosure.

Figure 9A:
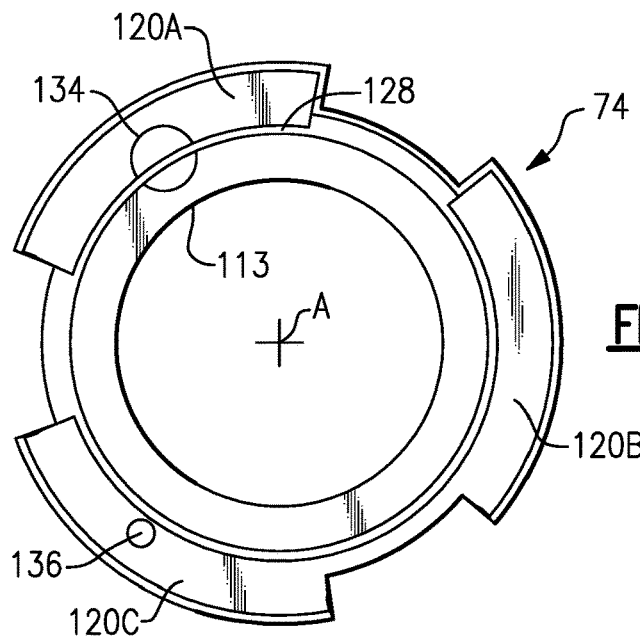
FIG. 9A is an inner end view of a second embodiment of the first end cover.
Figure 9B:
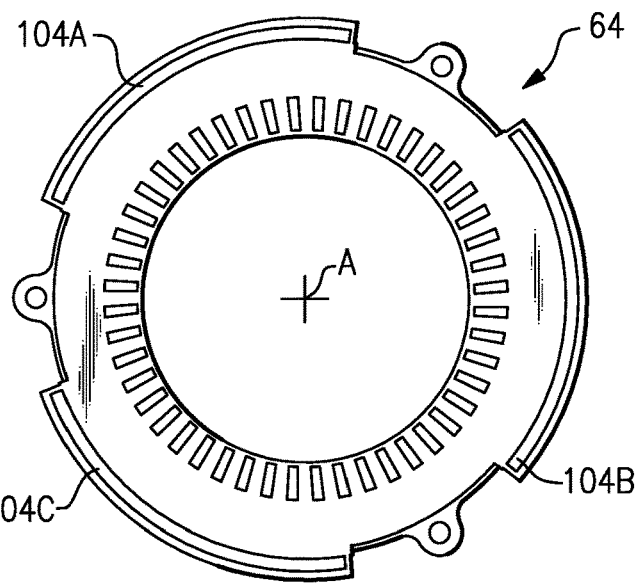
FIG. 9B is an end view of the stator.
Figure 9C:
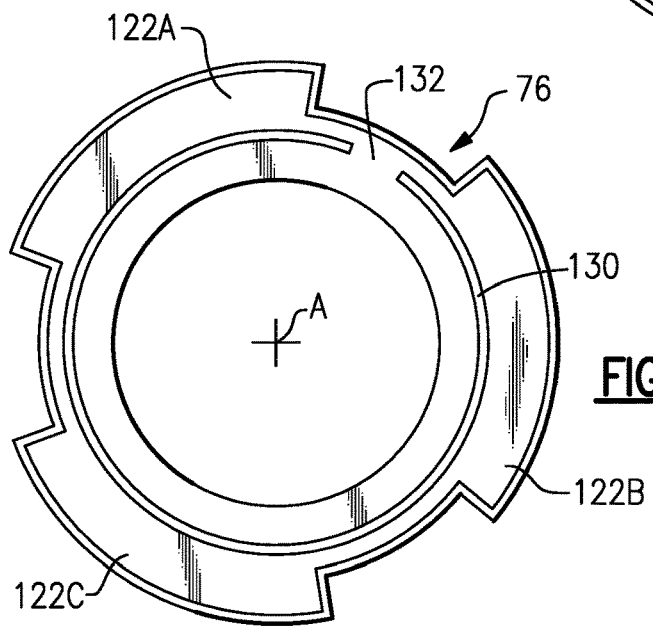
FIG. 9C is an inner end view of a second embodiment of the second end cover.

FIGS. 9A-9C illustrate another example embodiment. In this embodiment, the first end cover 74 includes a divider 128 without any circumferential gaps. The divider 128 is configured such that fluid F can flow, within the first end cover 74, between the sections 120B and 120C, but section 120A is fluidly isolated from the sections 120B and 120C. The second end cover 76 may be configured as in FIG. 8C or, as shown in FIG. 9C, may include a divider 130 with a circumferential gap 132 circumferentially between sections 122A and 122B, similar to how the divider 124 is arranged in FIG. 8A. Further, in this example, the first end cover includes an inlet 134 which is larger than the inlet 84, and is radially bisected by the divider 128. Thus, fluid F entering the inlet 134 flows on both radial sides of the divider 128. In particular, in an example, fluid F entering the inlet 134 flows through the channel 104A and the slots 94 toward the second end cover 76. The second end cover 76 then directs the fluid back toward the first end cover 74 through channels 104B and 104C, where it flows out the outlet 136.

Figure 10A:
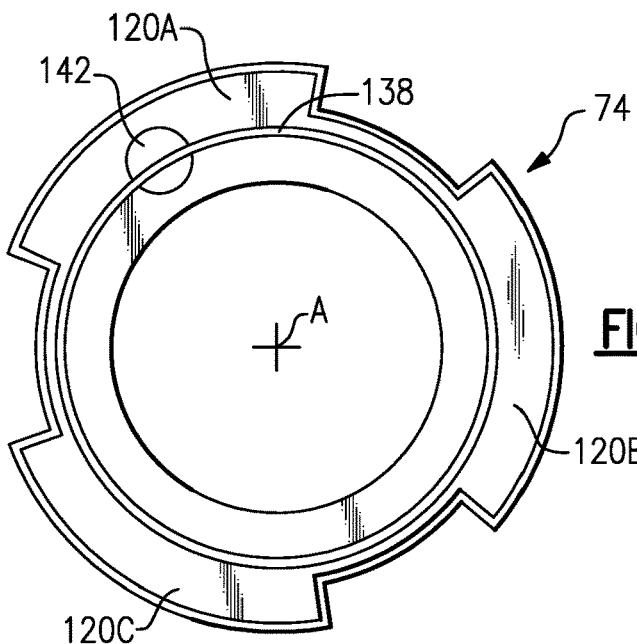
FIG. 10A is an inner end view of a third embodiment of the first end cover.
Figure 10B:
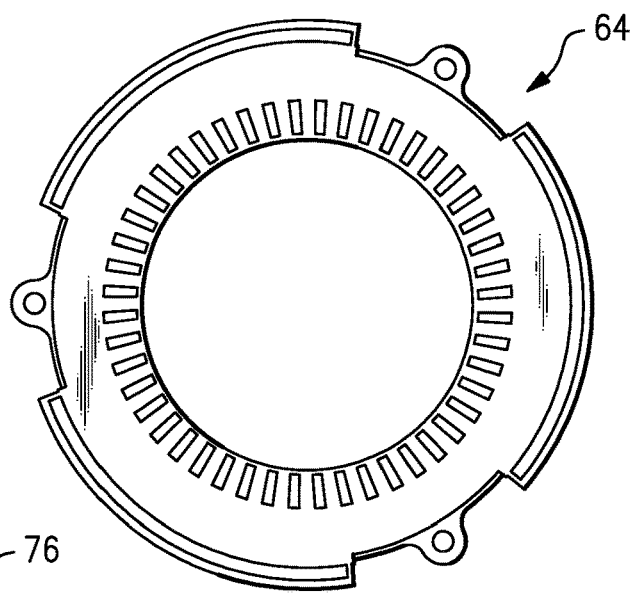
FIG. 10B is an end view of the stator.
Figure 10C:
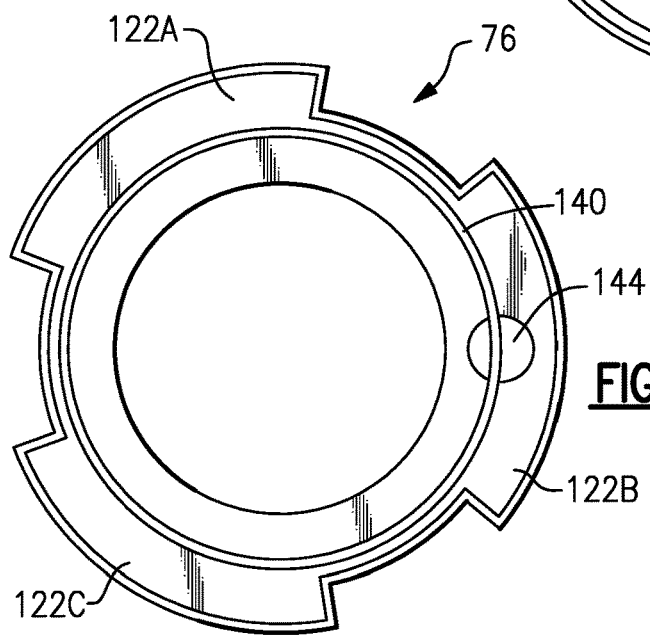
FIG. 10C is an inner end view of a third embodiment of the second end cover.

In another embodiment, in FIGS. 10A-10C, the first and second end covers 74, 76 include dividers 138, 140 without circumferential gaps. Further, the first end cover 74 includes an inlet 142 bisected by divider 138 and the second end cover 76 includes an outlet 144 bisected by divider 140. The sections 120A-120C are fluidly coupled together on the radially outer side of the divider 138, and the sections 122A-122C are fluidly coupled together on the radially outer side of divider 140. Fluid F entering the inlet 142 on the radially outer side of the divider 138 flows toward the second end cover 76 via the channels 104A-104C, and exits the second end cover 76 via the outlet 144 on the radially outer side of the divider 140. Fluid entering the inlet 142 on the radially inner side of the divider 138 flows toward the second end cover 76 via the slots 94 and exits the second end cover 76 via the outlet 144 on the radially inner side of the divider 142.

Figure 11A:
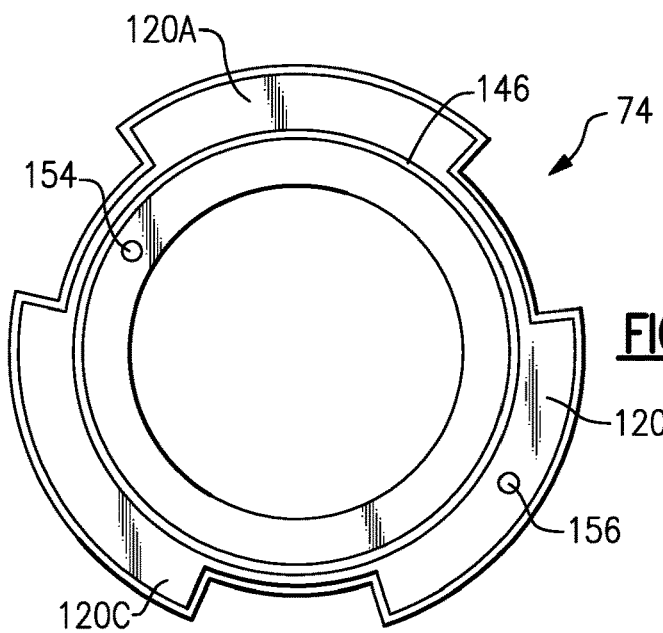
FIG. 11A is an inner end view of a fourth embodiment of the first end cover.
Figure 11B:
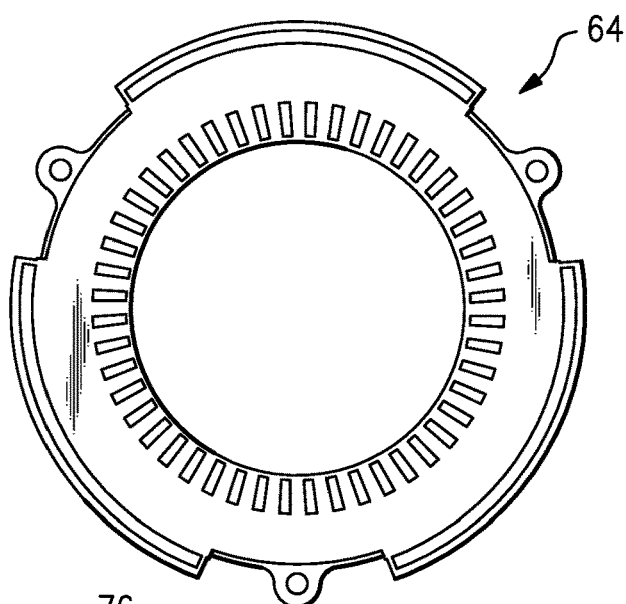
FIG. 11B is an end view of the stator.
Figure 11C:
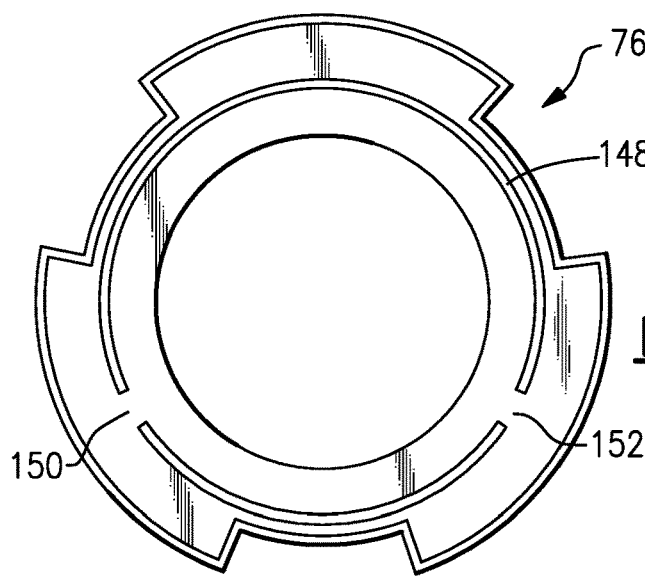
FIG. 11C is an inner end view of a fourth embodiment of the second end cover.

In yet another embodiment, in FIGS. 11A-11C, the first and cover 74 includes a divider 146 without any circumferential gaps. The sections 120A-120B are fluidly coupled together on the radially outer side of the divider 146. The second end cover 76 includes a divider 148 with two circumferential gaps 150, 152 to permit fluid F to flow radially across the divider 148. In this embodiment, fluid F entering an inlet 154 on a radially inner side of the divider 146 flows toward the second end cover 76 via the slots 94. The second end cover 76 directs fluid F through the gaps 150, 152 and through the channels 104A-104C back toward the first end cover 74, where the fluid F flows out an outlet 156 on the radially outer side of the divider 146.

Figure 12A:
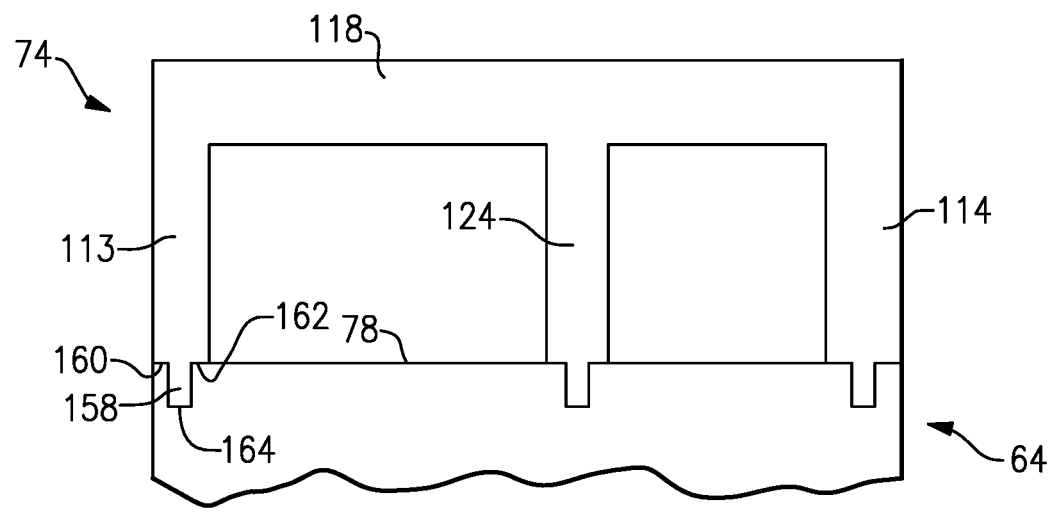
FIG. 12A is a cross-sectional view illustrating a first example interface between the first end cover and the stator.
Figure 12B:
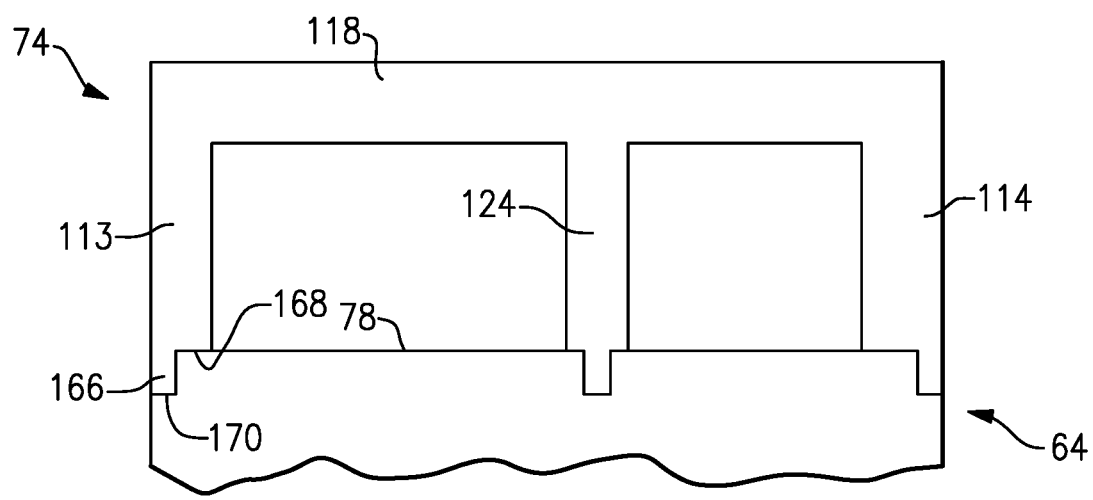
FIG. 12B is a cross-sectional view illustrating a second example interface between the first end cover and the stator.

FIGS. 12A and 12B are illustrations representative of example interfaces between the first and second end covers 74, 76 and the stator 64. Only the first end cover 74 is shown in FIGS. 12A and 12B, however. For instance, in FIG. 12A, each of the radially inner wall 113, the radially outer wall 114, and the divider 124 includes a free end having a projection resembling a T-shape in cross-section. Relative to the radially inner wall 113, the free end includes a projection 158 and a notch 160, 162 on each radial side of the projection. The notches 160, 162 directly abut the first axial end face 78, and the projection 158 is received in a recess 164 in the first axial end face 78.

The interfaces may be arranged differently, and, for example, in FIG. 12B the radially inner and outer walls 113, 114 include projections that resemble an L-shape in cross-section. In particular, relative to the radially inner wall 113, the free end includes a rim 166 and a notch 168 on a radially outer side thereof. The first axial end face 78 includes a notch 170 in a radially inner corner surface thereof, which receives the rim 166. The first axial end face 78 directly abuts the notch 168. In FIG. 12B, the radially outer wall 114 is arranged similar to the radially inner wall 113, except it includes a rim received in a notch in the radially outer corner surface of the first axial end face 78. The divider 124 in FIG. 12B is arranged as in FIG. 12A. These interfaces are exemplary. This disclosure extends to other interface arrangements, including combinations of various interface arrangements. The first and second end covers 74, 76 may be attached to the stator 64 using known techniques, including welding or gluing, and the interfaces prevent fluid leakage between the components.

It should be understood that directional terms such as "axial," "radial," and "circumferential" are used for purposes of explanation in the context of the components being described, and should not otherwise be considered limiting. Further, terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly for an electric machine of an electrified vehicle, comprising:
a stator including a core and a jacket at least partially encapsulating the core, wherein the jacket radially encloses a slot and is configured to permit fluid to flow within the slot from a first face of the stator to a second face of the stator, wherein the jacket includes a channel, and wherein the channel is on a radially opposite side of the core as the slot;
a first end cover covering the first face of the stator, wherein the first end cover includes an inlet port and is configured to direct fluid from the inlet port into the slot; and
a second end cover covering the second face of the stator and configured to direct fluid that exits the slot,
wherein the first end cover includes a divider,
wherein the inlet port is sized to permit fluid entering the first end cover to flow on opposite radial sides of the divider,
wherein fluid entering the first end cover on a radially inner side of the divider flows toward the second end cover via the slot, and
wherein fluid entering the first end cover on a radially outer side of the divider flows toward the second end cover via the channel.

2. The assembly as recited in claim 1, wherein the jacket is made of epoxy and the core is made of iron.

3. The assembly as recited in claim 1, wherein the second end cover is configured to direct fluid exiting the slot into the channel.

4. The assembly as recited in claim 1, wherein:
the first end cover includes an outlet port, and
the first end cover includes a divider radially between the inlet port and the outlet port.

5. The assembly as recited in claim 1, wherein:
the inlet port is configured to direct fluid into the channel and the slot, and
the second end cover includes an outlet port in fluid communication with fluid exiting the channel and the slot.

6. The assembly as recited in claim 1, wherein the slot is one of a plurality of slots.

7. The assembly as recited in claim 1, wherein coil windings are arranged in the slot.

8. The assembly as recited in claim 1, wherein:
the first end cover includes a projection and the first face of the stator includes a recess receiving the projection of the first end cover, and
the second end cover includes a projection and the second face of the stator includes a recess receiving the projection of the second end cover.

9. The assembly as recited in claim 1, further comprising a rotor configured to rotate within the stator.

10. The assembly as recited in claim 1, wherein the electric machine is an electric motor.

11. The assembly as recited in claim 1, wherein the jacket is formed over the core by a molding process such that the jacket and core provide an integrated structure following the molding process.

12. The assembly as recited in claim 1, wherein the portion of the jacket radially enclosing the slot is integrally connected to the portion of the jacket forming the channel.

13. An assembly for an electric machine of an electrified vehicle, comprising
   a stator including a core and a jacket at least partially surrounding the core, wherein the jacket radially encloses a slot and is configured to permit fluid to flow within the slot from a first face of the stator to a second face of the stator;
   a first end cover covering the first face of the stator, wherein the first end cover includes an inlet port and is configured to direct fluid from the inlet port into the slot; and
   a second end cover covering the second face of the stator and configured to direct fluid that exits the slot,
   wherein the jacket includes a channel, and wherein the channel is on a radially opposite side of the stator as the slot,
   wherein the channel is one of at least two channels,
   wherein the inlet port is configured to direct fluid into the slot and a first channel of the at least two channels,
   wherein the second end cover is configured to direct fluid exiting the slot and the first channel into a second channel of the at least two channels, and
   wherein the first end cover includes an outlet port in fluid communication with the second channel.

14. The assembly as recited in claim 7, wherein the at least two channels includes three channels circumferentially spaced-apart from one another by mounting tabs of the stator.

15. An assembly for an electric machine of an electrified vehicle, comprising:
   a stator including a core and a jacket at least partially encapsulating the core, wherein the jacket radially encloses a slot and is configured to permit fluid to flow within the slot from a first face of the stator to a second face of the stator, wherein the jacket includes a channel, and wherein the channel is on a radially opposite side of the core as the slot;
   a first end cover covering the first face of the stator, wherein the first end cover includes an inlet port and is configured to direct fluid from the inlet port into the slot; and
   a second end cover covering the second face of the stator and configured to direct fluid that exits the slot,
   wherein the first end cover includes a divider,
   wherein the inlet port is sized to permit fluid entering the first end cover to flow on opposite radial sides of the divider, and
   wherein the inlet port is bisected by the divider.

* * * * *